(12) United States Patent
Simmons et al.

(10) Patent No.: US 7,526,737 B2
(45) Date of Patent: Apr. 28, 2009

(54) FREE FORM WIPER

(75) Inventors: Alex J. Simmons, Redmond, WA (US); Benoit Barabe, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 11/272,960

(22) Filed: Nov. 14, 2005

(65) Prior Publication Data
US 2007/0109281 A1 May 17, 2007

(51) Int. Cl.
*G09G 5/00* (2006.01)
*G06F 17/00* (2006.01)
*G06F 3/00* (2006.01)

(52) U.S. Cl. .................... 715/856; 345/173; 345/174; 345/175; 345/179; 715/862; 715/863

(58) Field of Classification Search ................ 715/770, 715/863, 856, 862; 345/170, 173, 174, 175, 345/179, 419
See application file for complete search history.

(56) References Cited

U.S. PATENT DOCUMENTS

| | | | |
|---|---|---|---|
| 2,354,332 A | 7/1944 | Polydoroff | 343/788 |
| 5,063,376 A | 11/1991 | Chang | 345/163 |
| 5,063,600 A | 11/1991 | Norwood | 345/173 |
| 5,133,076 A | 7/1992 | Hawkins et al. | 708/141 |
| 5,231,698 A | 7/1993 | Forcier | 715/541 |
| 5,321,768 A | 6/1994 | Fenrich et al. | 382/178 |
| 5,327,342 A | 7/1994 | Roy | 345/467 |
| 5,347,295 A | 9/1994 | Agulnick et al. | 345/156 |
| 5,367,453 A | 11/1994 | Capps et al. | 715/531 |
| 5,390,281 A | 2/1995 | Luciw et al. | 395/12 |
| 5,404,442 A | 4/1995 | Foster et al. | 395/159 |
| 5,434,929 A | 7/1995 | Beernink et al. | 382/187 |
| 5,442,742 A | 8/1995 | Greyson et al. | 715/539 |
| 5,446,882 A | 8/1995 | Capps et al. | 707/104.1 |
| 5,465,325 A | 11/1995 | Capps et al. | 345/441 |
| 5,477,447 A | 12/1995 | Luciw et al. | 704/9 |

(Continued)

FOREIGN PATENT DOCUMENTS

DE  40 26 852 A1  2/1991

(Continued)

OTHER PUBLICATIONS

Ken Hinckley et al. "Design and analysis of delimiters for selection action pen gesture phrases in scriboli" Apr. 2005 10 pages.*

(Continued)

*Primary Examiner*—Kieu D Vu
*Assistant Examiner*—Haoshian Shih
(74) *Attorney, Agent, or Firm*—Merchant & Gould; Ryan T. Grace

(57) ABSTRACT

A free-form wiper tool may be used to select and move document objects in an electronic document. A free-form wipe selection may be determined by analyzing the shape of a free-form selection in order to distinguish it from a free-form lasso selection. Once determined, document objects situated on the document in an intended direction are selected. The group of selected objects may be moved, although selected objects may be restricted in their movement, so as to be wiped or moved along only one degree of motion. Selection input may be made using a stylus and a tablet computer, and document objects may include electronic ink.

20 Claims, 11 Drawing Sheets

U.S. PATENT DOCUMENTS

| | | | | |
|---|---|---|---|---|
| 5,479,596 | A | 12/1995 | Capps et al. | 715/539 |
| 5,491,495 | A | 2/1996 | Ward et al. | 345/173 |
| 5,500,937 | A | 3/1996 | Thompson-Rohrlich | 715/764 |
| 5,513,309 | A | 4/1996 | Meier et al. | 715/860 |
| 5,517,578 | A | 5/1996 | Altman et al. | 382/181 |
| 5,523,775 | A | 6/1996 | Capps | 345/179 |
| 5,528,743 | A | 6/1996 | Tou et al. | 715/541 |
| 5,544,295 | A | 8/1996 | Capps | 345/473 |
| 5,544,358 | A | 8/1996 | Capps et al. | 715/523 |
| 5,555,363 | A | 9/1996 | Tou et al. | 715/541 |
| 5,559,942 | A | 9/1996 | Gough et al. | 715/802 |
| 5,561,446 | A | 10/1996 | Montlick | 345/173 |
| 5,579,467 | A | 11/1996 | Capps | 715/507 |
| 5,583,542 | A | 12/1996 | Capps et al. | 345/173 |
| 5,588,105 | A | 12/1996 | Foster et al. | 715/779 |
| 5,590,257 | A | 12/1996 | Forcier | 715/530 |
| 5,592,566 | A | 1/1997 | Pagallo et al. | 382/187 |
| 5,594,640 | A | 1/1997 | Capps et al. | 715/532 |
| 5,596,350 | A | 1/1997 | Capps et al. | 345/173 |
| 5,596,694 | A | 1/1997 | Capps | 345/173 |
| 5,596,697 | A | 1/1997 | Foster et al. | 715/810 |
| 5,602,570 | A | 2/1997 | Capps et al. | 345/173 |
| 5,613,019 | A | 3/1997 | Altman et al. | 382/311 |
| 5,634,102 | A | 5/1997 | Capps | 715/744 |
| 5,649,133 | A | 7/1997 | Arquie | 715/764 |
| 5,655,136 | A | 8/1997 | Morgan | 382/187 |
| 5,666,139 | A | 9/1997 | Thielens et al. | 345/173 |
| 5,666,552 | A | 9/1997 | Greyson et al. | 715/539 |
| 5,671,438 | A | 9/1997 | Capps et al. | 715/539 |
| 5,682,439 | A | 10/1997 | Beernink et al. | 382/187 |
| 5,710,831 | A | 1/1998 | Beernink et al. | 382/189 |
| 5,745,716 | A | 4/1998 | Tchao et al. | 715/777 |
| 5,757,383 | A | 5/1998 | Lipton | 345/442 |
| 5,760,773 | A | 6/1998 | Berman et al. | 715/808 |
| 5,764,818 | A | 6/1998 | Capps et al. | 382/317 |
| 5,768,418 | A | 6/1998 | Berman et al. | 382/187 |
| 5,778,404 | A | 7/1998 | Capps et al. | 715/531 |
| 5,796,397 | A | 8/1998 | Kusano | 715/804 |
| 5,809,498 | A | 9/1998 | Lopresti et al. | 707/6 |
| 5,838,326 | A | 11/1998 | Card et al. | 715/775 |
| 5,838,819 | A | 11/1998 | Ruedisueli et al. | 382/187 |
| 5,864,635 | A | 1/1999 | Zetts et al. | 382/187 |
| 5,867,150 | A | 2/1999 | Bricklin | 345/173 |
| 5,874,957 | A | 2/1999 | Cline et al. | 715/786 |
| 5,880,743 | A | 3/1999 | Moran et al. | 345/473 |
| 5,911,145 | A | 6/1999 | Arora et al. | 715/514 |
| 5,953,735 | A | 9/1999 | Forcier | 715/541 |
| 5,963,208 | A | 10/1999 | Dolan et al. | 715/760 |
| 5,970,455 | A | 10/1999 | Wilcox et al. | 704/270 |
| 5,993,391 | A | 11/1999 | Kamiyama | 345/607 |
| 6,020,895 | A | 2/2000 | Azami | 345/619 |
| 6,021,218 | A | 2/2000 | Capps et al. | 382/187 |
| 6,035,324 | A | 3/2000 | Chang et al. | 709/203 |
| 6,061,472 | A | 5/2000 | Hullender et al. | 382/187 |
| 6,069,626 | A | 5/2000 | Cline et al. | 715/786 |
| 6,081,829 | A | 6/2000 | Sidana | 709/203 |
| 6,108,445 | A | 8/2000 | Uehara | 382/189 |
| 6,128,007 | A | 10/2000 | Seybold | 345/179 |
| 6,128,633 | A | 10/2000 | Michelman et al. | 715/525 |
| 6,154,219 | A | 11/2000 | Wiley et al. | 345/587 |
| 6,154,758 | A | 11/2000 | Chiang | 715/541 |
| 6,188,405 | B1 | 2/2001 | Czerwinski et al. | 715/764 |
| 6,199,125 | B1 | 3/2001 | Cortesi | 710/67 |
| 6,223,145 | B1 | 4/2001 | Hearst | 703/22 |
| 6,243,258 | B1 | 6/2001 | Paratore | 361/680 |
| 6,279,014 | B1 | 8/2001 | Schilit et al. | 715/512 |
| 6,295,372 | B1 | 9/2001 | Hawkins et al. | 382/187 |
| 6,304,272 | B1 | 10/2001 | Schanel et al. | 345/676 |
| 6,337,698 | B1 | 1/2002 | Keely, Jr. et al. | 715/823 |
| 6,340,967 | B1 | 1/2002 | Maxted | 345/179 |
| 6,345,389 | B1 | 2/2002 | Dureau | 725/116 |
| 6,348,935 | B1 | 2/2002 | Malacinski et al. | 715/853 |
| 6,355,889 | B1 | 3/2002 | Butcher | 178/18.03 |
| 6,380,957 | B1 | 4/2002 | Banning | 715/828 |
| 6,487,567 | B1 | 11/2002 | Michelman et al. | 715/525 |
| 6,487,569 | B1 | 11/2002 | Lui et al. | 715/530 |
| 6,529,215 | B2 | 3/2003 | Golovchinsky et al. | 715/764 |
| 6,546,397 | B1 | 4/2003 | Rempell | 707/102 |
| 6,559,871 | B1 | 5/2003 | Brozowski et al. | 715/853 |
| 6,565,611 | B1 | 5/2003 | Wilcox et al. | 715/541 |
| 6,570,596 | B2 | 5/2003 | Frederiksen | 715/808 |
| 6,594,390 | B2 | 7/2003 | Frink et al. | 382/187 |
| 6,650,347 | B1 | 11/2003 | Nulu et al. | 715/853 |
| 6,651,221 | B1 | 11/2003 | Thomason et al. | 715/541 |
| 6,654,035 | B1 | 11/2003 | DeStefano | 715/798 |
| 6,661,409 | B2 | 12/2003 | Demartines et al. | 345/173 |
| 6,678,865 | B1 | 1/2004 | Pratley et al. | 715/509 |
| 6,681,045 | B1 | 1/2004 | Lapstun et al. | 382/187 |
| 6,683,600 | B1 | 1/2004 | Lui | 345/179 |
| 6,690,364 | B1 | 2/2004 | Webb | 345/173 |
| 6,727,927 | B1 | 4/2004 | Dempski et al. | 715/853 |
| 6,741,749 | B2 | 5/2004 | Herbert, Jr. | 382/246 |
| 6,801,190 | B1 | 10/2004 | Robinson et al. | 345/173 |
| 6,833,827 | B2 | 12/2004 | Lui et al. | 345/173 |
| 6,836,759 | B1 | 12/2004 | Williamson et al. | 704/235 |
| 6,859,909 | B1 | 2/2005 | Lerner et al. | 715/512 |
| 6,989,822 | B2 | 1/2006 | Pettiross et al. | 345/179 |
| 7,002,560 | B2 | 2/2006 | Graham | 345/179 |
| 7,039,234 | B2 | 5/2006 | Geidl et al. | 382/187 |
| 7,055,110 | B2 | 5/2006 | Kupka | 715/863 |
| 7,079,713 | B2 | 7/2006 | Simmons | 382/321 |
| 7,091,959 | B1 | 8/2006 | Clary | 345/173 |
| 7,096,432 | B2 | 8/2006 | Huapaya et al. | 715/863 |
| 7,174,042 | B1 | 2/2007 | Simmons et al. | 382/187 |
| 7,185,278 | B1* | 2/2007 | Simmons | 715/235 |
| 7,188,309 | B2 | 3/2007 | Simmons et al. | 715/244 |
| 7,240,300 | B2* | 7/2007 | Jaeger | 715/863 |
| 7,259,752 | B1 | 8/2007 | Simmons | 345/173 |
| 7,259,753 | B2 | 8/2007 | Keely et al. | 345/179 |
| 7,353,453 | B1 | 4/2008 | Simmons | 715/268 |
| 7,358,965 | B2 | 4/2008 | Barabe et al. | 345/179 |
| 7,370,288 | B1 | 5/2008 | Simmons et al. | 715/854 |
| 2001/0000960 | A1 | 5/2001 | Dettloff | 343/748 |
| 2002/0078035 | A1 | 6/2002 | Frank et al. | 707/3 |
| 2002/0097270 | A1 | 7/2002 | Keely et al. | 345/764 |
| 2002/0126153 | A1 | 9/2002 | Withers et al. | 345/773 |
| 2003/0066031 | A1 | 4/2003 | Laane | 715/513 |
| 2003/0071850 | A1 | 4/2003 | Geidl | 345/781 |
| 2003/0085931 | A1 | 5/2003 | Card et al. | 345/853 |
| 2003/0119469 | A1 | 6/2003 | Karr et al. | 455/307 |
| 2003/0214491 | A1 | 11/2003 | Keely et al. | 345/179 |
| 2003/0214531 | A1 | 11/2003 | Chambers et al. | 345/764 |
| 2003/0215142 | A1 | 11/2003 | Gounares | 382/190 |
| 2003/0227491 | A1 | 12/2003 | Moehrle | 345/854 |
| 2004/0003350 | A1 | 1/2004 | Simmons et al. | 715/517 |
| 2004/0021701 | A1 | 2/2004 | Iwema et al. | 345/863 |
| 2004/0060000 | A1 | 3/2004 | Jaeger | 715/502 |
| 2004/0135824 | A1 | 7/2004 | Fitzmaurice | 345/856 |
| 2004/0141015 | A1 | 7/2004 | Fitzmaurice et al. | 345/856 |
| 2005/0028081 | A1 | 2/2005 | Arcuri et al. | 715/501.1 |
| 2005/0179647 | A1 | 8/2005 | Simmons et al. | 345/156 |
| 2005/0183029 | A1 | 8/2005 | Barabe et al. | 715/779 |
| 2005/0206627 | A1 | 9/2005 | Simmons | 345/179 |
| 2006/0001656 | A1* | 1/2006 | LaViola et al. | 345/179 |
| 2006/0233464 | A1 | 10/2006 | Simmons | 382/321 |
| 2006/0267967 | A1* | 11/2006 | Hinckley et al. | 345/179 |

FOREIGN PATENT DOCUMENTS

| | | | |
|---|---|---|---|
| EP | 0460420 | A2 | 12/1991 |
| EP | 0 780 797 | A | 6/1997 |
| EP | 1 376 390 | A | 1/2004 |
| EP | 1450294 | A1 | 8/2004 |
| EP | 1486883 | A2 | 12/2004 |

| | | | |
|---|---|---|---|
| GB | 2 313 993 A | 12/1997 | |
| JP | 3-270403 | 12/1991 | |

OTHER PUBLICATIONS

Wilcox et al., "Dynomite: A Dynamically Organized Ink and Audio Notebook," Computer-Human Interaction, Mar. 27, 1997, pp. 186-193.
Jakobsen, T., "Advanced Character Physics," Game Developer's Conference, 2001 Proceedings, pp. 1-17.
Fitzmaurice et al., "Tracking Menus," CHI 2003, vol. 5, No. 2, pp. 71-80, 2003.
U.S. Official Action mailed Aug. 5, 2008, in U.S. Appl. No. 10/781,489.
U.S. Appl. No. 10/780,366 filed Feb. 17, 2004, entitled "Writing Guide for a Free-Form document Editor", Inventors: Alex Simmons et al.
U.S. Official Action mailed Nov. 19, 2008, in U.S. Appl. No.10/804,616.
U.S. Official Action mailed Jan. 10, 2008, in U.S. Appl. No. 10/804,616.
U.S. Official Action mailed Jul. 12, 2007, in U.S. Appl. No. 10/804,616.
U.S. Official Action mailed Aug. 5, 2008, in U.S. Appl. No. 10/781,489.
U.S. Official Action mailed Dec. 27, 2007, in U.S. Appl. No. 10/781,489.
U.S. Official Action mailed Jun. 28, 2007, in U.S. Appl. No. 10/781,489.
U.S. Official Action mailed Nov. 7, 2006, in U.S. Appl. No. 10/781,489.
U.S. Official Action mailed Apr. 20, 2006, in U.S. Appl. No. 10/781,489.
U.S. Official Action mailed Aug. 20, 2008, in U.S. Appl. No. 10/780,366.
U.S. Official Action mailed Nov. 14, 2007, in U.S. Appl. No. 10/780,366.
U.S. Official Action mailed Sep. 20, 2005, in U.S. Appl. No. 10/186,463.
U.S. Official Action mailed May 18, 2007, in U.S. Appl. No. 10/186,820.
U.S. Official Action mailed Nov. 24, 2006, in U.S. Appl. No. 10/186,820.
U.S. Official Action mailed Nov. 9, 2006, in U.S. Appl. No. 10/186,820.
U.S. Official Action mailed Mar. 2, 2006, in U.S. Appl. No. 10/186,820.
U.S. Official Action mailed Aug. 10, 2005, in U.S. Appl. No. 10/186,820.
U.S. Official Action mailed Mar. 1, 2006, in U.S. Appl. No. 10/186,837.
U.S. Official Action mailed May 25, 2005, in U.S. Appl. No. 10/186,837.
U.S. Official Action mailed Mar. 13, 2006, in U.S. Appl. No. 10/186,812.
U.S. Official Action mailed Jul. 13, 2005, in U.S. Appl. No. 10/186,812.
U.S. Official Action mailed Feb. 28, 2005, in U.S. Appl. No. 10/186,812.
U.S. Official Action mailed Apr. 21, 2006, in U.S. Appl. No. 10/186,865.
U.S. Official Action mailed Sep. 20, 2005, in U.S. Appl. No. 10/186,865.
U.S. Official Action mailed Aug. 22, 2007, in U.S. Appl. No. 10/186,874.
U.S. Official Action mailed Jan. 3, 2007, in U.S. Appl. No. 10/186,874.
U.S. Officical Action mailed Aug. 10, 2006, in U.S. Appl. No. 10/186,874.
U.S. Official Action mailed Jun. 29, 2005, in U.S. Appl. No. 10/186,874.
U.S. Official Action mailed Sep. 15, 2006, in U.S. Appl. No. 10/186,847.
U.S. Official Action mailed Jan. 27, 2006, in U.S. Appl. No. 10/186,847.
U.S. Official Action mailed Jul. 27, 2005, in U.S. Appl. No. 10/186,847.
U.S. Official Action mailed Nov. 12, 2008, in U.S. Appl. No. 10/782,133.
U.S. Official Action mailed Feb. 20, 2008, in U.S. Appl. No. 10/782,133.
U.S. Official Action mailed Sep. 18, 2007, in U.S. Appl. No. 10/782,133.
U.S. Official Action mailed Mar. 2, 2007, in U.S. Appl. No. 10/782,133.
U.S. Official Action mailed Jan. 3, 2007, in U.S. Appl. No. 10/782,132.
Microsoft Word 2000, Microsoft Corporation (9.0.6926 sp-3).
European Search Report dated Nov. 11, 2005.
Wacom Intuos TM User's Manual for Windows, May 22, 2000, copyright Wacom Company, Ltd., pp. 1-165 (Part 1: pp 1-60: Part 2: pp. 61-120 ; Part 3: pp. 121-165).
U.S. Official Action mailed Dec. 17, 2004, in U.S. Appl. No. 10/186,837.

* cited by examiner

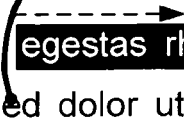

1 Lorem ipsum dolor sit amet, consectetuer
2 adipiscing elit. Praesent egestas mattis neque.
3 Vestibulum interdum diam non felis. Sed augue
4 lorem, egestas porttitor, egestas rhoncus, vulputate
5 vel, nunc. Vestibulum sed dolor ut quam bibendum
6 interdum. Nunc convallis, nulla id venenati.

FIG. 10

1 Lorem ipsum dolor sit amet, consectetuer
2 adipiscing elit. Praesent egestas mattis neque.
3 Vestibulum interdum diam non felis. Sed augue
4 lorem, egestas porttitor,     egestas rhoncus,
5 vulputate vel, nunc. Vestibulum sed dolor ut quam
6 bibendum interdum. Nunc convallis, nulla id venenati.

FIG. 11

1 Lorem ipsum dolor sit amet, consectetuer
2 adipiscing elit. Praesent egestas mattis neque.
3 Vestibulum interdum diam non felis. Sed augue
4 lorem, egestas porttitor, *et ta* egestas rhoncus,
5 vulputate vel, nunc. Vestibulum sed dolor ut quam
6 bibendum interdum. Nunc convallis, nulla id venenati.

FIG. 12

FREE FORM WIPER

RELATED APPLICATIONS

This patent application is related to co-pending non-provisional U.S. patent application Ser. No. 10/186,837 entitled "Space Management for Electronic Documents," which is hereby incorporated by reference.

BACKGROUND

Whether for word processing, note taking, slide presentations, or graphics editing, nearly every computer user has edited a document at one time or another. Although initially purely text-based, software applications for editing documents have greatly benefited from the advent of graphical operating systems. Interactive what-you-see-is-what-you-get (WYSIWYG) interfaces and additional enhancements of such operating systems have made software applications more accessible and intuitive for average users.

Electronic ink interfaces in particular have enhanced the common tasks associated with editing documents. Users have benefited from the ability to interact directly with a computer display, easily handwriting, drawing figures, and otherwise manipulating document objects using a stylus, finger, or other implement. While similar to the point-and-click paradigm of using a mouse, electronic ink makes many document-editing tasks even easier, a prime example being handwriting.

Virtually every document-editing task associated with a point-and-click mouse or trackball has been replicated for use with a stylus and electronic ink. As such, users may create text and drawings, as well as select and manipulate objects using a stylus and conventional editing tools. However, new paradigms for editing documents may be made possible by electronic ink. Such paradigms may allow for even faster and more efficient document editing, enabling users to, for example, select and move several objects vertically or horizontally on a page.

Previously, a wiper bar tool has been described. Such tools may allow for objects in a document to be moved up or down a page, extending page margins appropriately. A wiper tool may be invoked by setting an insertion point and signaling a wipe. Whereas the wiper bar tool may be useful for creating space on a page, it may not allow unrestricted wiping and may not fully take advantage of the unique features of electronic ink.

There is a need in the art for new document editing paradigms that leverage the unique features of electronic ink, particularly for the unrestricted selection and movement of document objects.

SUMMARY

Methods and systems are provided for receiving a selection input capable of selecting objects in a document within certain portions of the document. A free-form selection path is entered by a user with a mouse, stylus, or other input device. The path may be analyzed to determine whether it is intended to be a free-form wipe, or other type of selection (e.g., lasso selection). Next the path is analyzed to determine a direction of selection, whether above, below, to the left or right (or quadrant subsets thereof) of the selection path. Users may further modify selected objects with further input; for example, changing which side of a selection path should be selected based on cursor movement.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

FIGS. 10-12 depict text moved with a horizontal wipe in order to insert new text according to one or more embodiments.

DETAILED DESCRIPTION

A free-form wiper tool may take advantage of the unique features of electronic ink, allowing for vertical or horizontal selection and movement of objects across an electronic document. The results in the flexible insertion of empty space into which additional objects may be moved or created. A wipe selection may be limited in the direction it can move, only horizontally or vertically, for example. By analyzing the path of a stylus across a page, it can be determined whether a user intends a wipe or lasso type selection. Further, it can be determined whether a horizontal or vertical wipe is intended, and if horizontal, whether the wipe will be to the left or the right. Furthermore, a direction and distance of a wipe can be determined. Provided below are examples and descriptions of various embodiments of a free-form wiper, including examples of operating environments in which the wiper may be implemented. Further, provided are examples of the methods that may be used to implement the tool.

Figure 1:
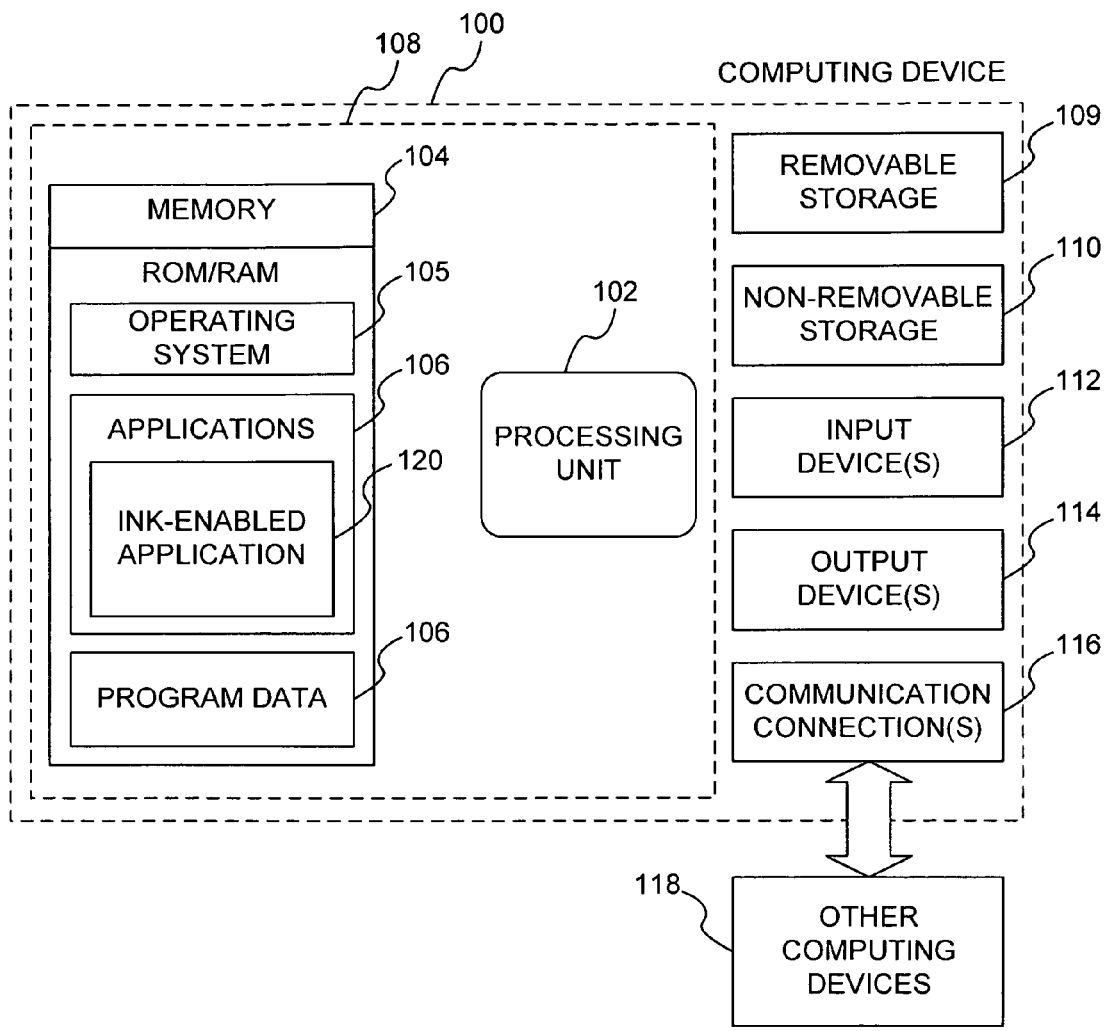
FIG. 1 depicts an exemplary operating environment in which one or more embodiments may be implemented.

FIG. 1 depicts an exemplary operating environment in which one or more embodiments may be implemented. The operating environment may comprise computing device 100 which may work alone or with other computing devices 118. Computing device 100 may comprise memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples of embodiments.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoding a computer program of instructions for executing a process on computing device 100. The computer program product may also be a propagated signal on a carrier readable by a computing system and subsequently stored on a computer readable medium on computing device 100.

With reference to FIG. 1, the embodiment shown may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. In one embodiment, applications 106 may include an electronic ink-enabled application 120. Examples of operating system 105 are found in the family of WINDOWS operating systems from MICROSOFT CORPORATION of Redmond, Wash.

Although the basic computing device configuration is contained with dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) keys, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 2:
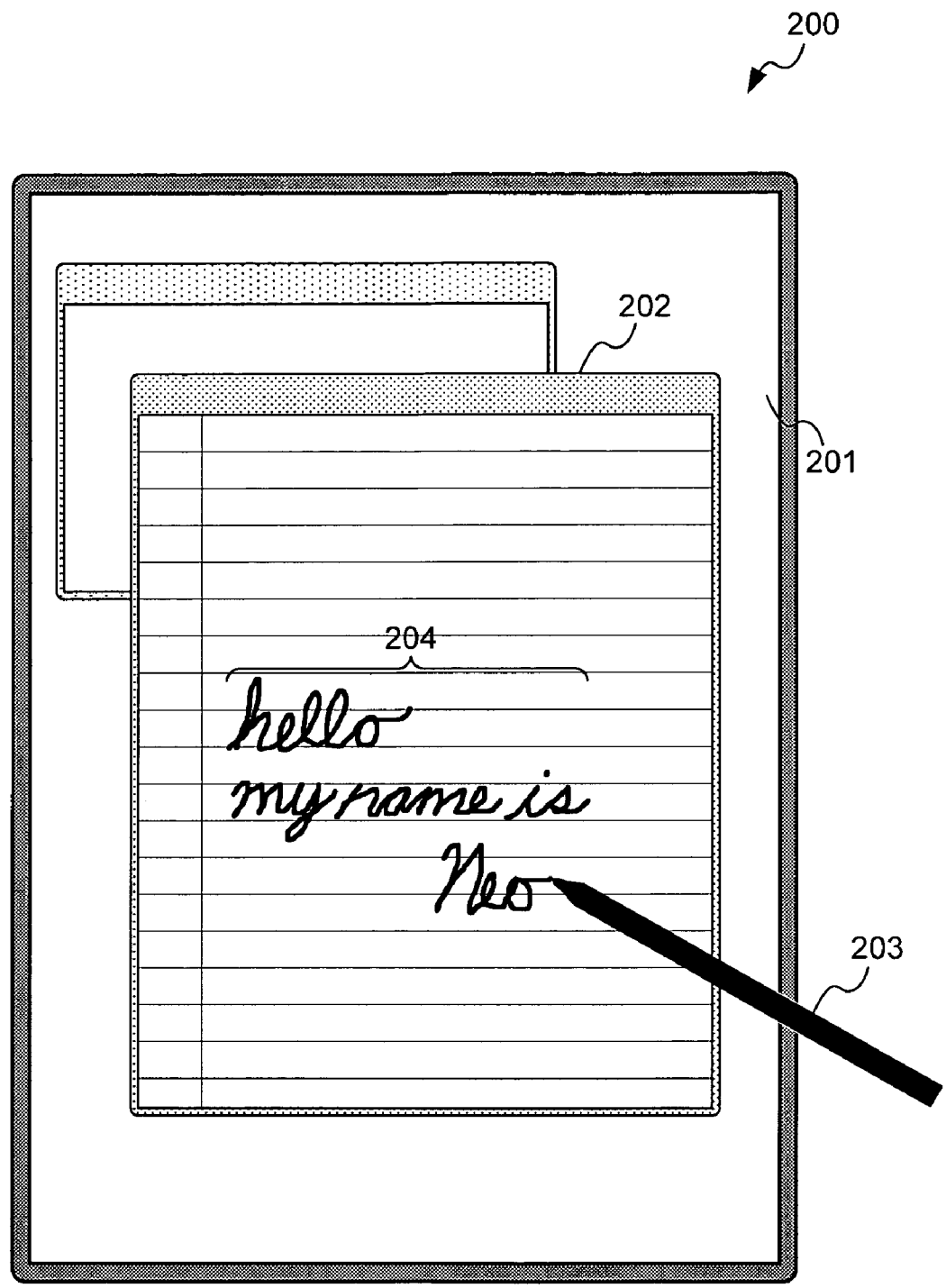
FIG. 2 depicts an exemplary operating environment in which one or more embodiments may be implemented.

FIG. 2 depicts an exemplary operating environment in which one or more embodiments may be implemented. In certain embodiments, tablet computer 200 may be an implementation of generic computing device 100. Tablet computer 200 includes sensitive display 201, which may be touch-sensitive and/or electro-magnetically sensitive. Other types of sensing displays may also be used. Tablet computer 200 has a graphical operating system 105 installed, one that uses multiple windows to display the interfaces of various software applications in use on the computer.

One piece of software installed on tablet computer 200 may be an electronic ink-enabled application 120, for which window 202 may be the visible interface on display 201. Electronic ink is a term used generally to refer to handwritten input for use with computing devices. This input may be entered using a stylus (or other pointing implement) 203 in proximity to a display, as displayed in FIG. 2. Likewise, electronic ink may be input using a touch pad, tablet, mouse, or other input device allowing free-hand input. Ink-enabled operating systems and/or applications should generally be able to receive, display, and process this free-hand input, although software translators may allow non-ink-enabled software to receive input in this fashion.

FIG. 2 includes an example of electronic ink input 204, which has been input into ink-enabled application 120 using stylus 203, and displayed as handwriting on window 202. A user is able to press stylus 203 to display 201 and move it as if the user were writing. Display 200 may include a touch-sensitive or electro-magnetically sensitive layer that senses the location of stylus 203 and digitizes the position. As the stylus moves, additional digitized positions are provided. These positions may be in the form of horizontal and vertical pixel values, or some other scale. In addition, the exerted pressure (or tip proximity) may be measured and the value stored along with the position. Furthermore, a relative or absolute time may be stored with the position as well. This sequence of positions and/or measurements may be stored in a data structure referred to as an ink object. Furthermore, an ink object may include a series of strokes, which may be comprised of individual positions and measurements of free-hand input.

Ink objects may represent handwritten words, drawings, annotations, etc. An ink processing program module may discern between these various types of ink objects, examining both an object and its constituent strokes, possibly referencing nearby text and ink objects for context. Furthermore, a program module may recognize handwritten words and symbols and provide an interpretation as text or other recognizable objects. For example, the handwritten word "hello" is displayed as a part of electronic ink 204. A program module may be able to recognize each of the letters in context and provide an interpretation of "hello" as text, usable as additional input by ink-enabled application 120.

The editing of documents frequently involves the use of selection tools, which assist a user in applying a common characteristic to a group of objects, be they text, images, ink objects, or other. Selection tools enable a user to select objects en masse, either by individually indicating the objects (e.g., clicking while holding down a Control key on a keyboard), selecting a box of objects (e.g., dragging a mouse to create a rectangle around a group of objects), or even selecting an irregularly shaped collection of nearby objects (e.g., dragging a mouse around the objects to create a selection boundary). Each of these selection methods is useful in different editing situations. Each has a different trigger for invoking the tool (e.g., the Control key, a selection command, a lasso icon, etc.). Ink enabled selection may involve the use of a lasso tool, by selecting a lasso icon, but it may also be triggered through use of a gesture, where the stylus is moved above the surface of display 201 in a particular fashion, possibly recognized using electro-magnetic sensors.

Figure 3:
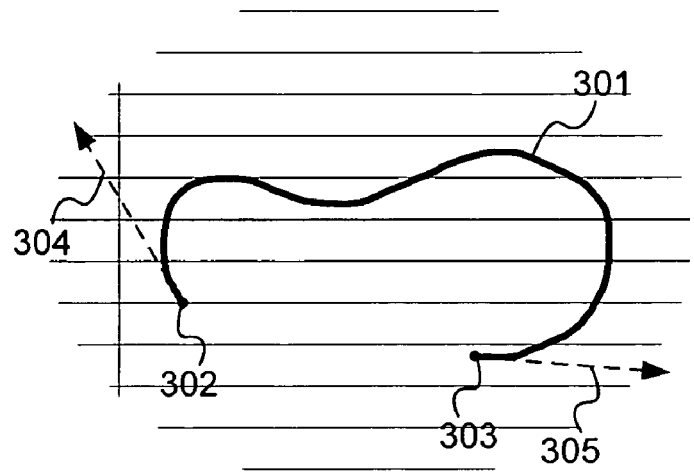
FIGS. 3 and 4 depict free-form selection boundaries according to one or more embodiments of the invention.
Figure 4:
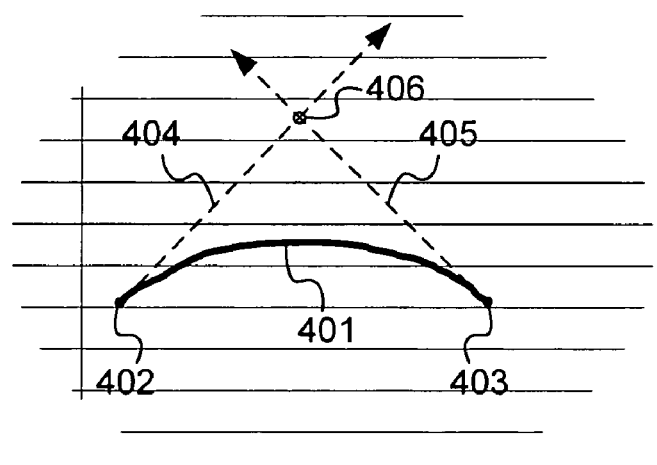

FIGS. 3 and 4 depict free-form selection boundaries (or paths) according to one or more embodiments of the invention. FIG. 3 depicts a possible selection path that may be used when "lasso" selecting a collection of objects. FIG. 4 depicts a possible selection path that may by used when using a wiper tool to select objects. Although these two selection methods may be triggered by separate commands, buttons, icons, or gestures, it may be possible to trigger free-form selection using a single command, and then examining the selection path to figure out what type of selection tool is intended. These selection paths may have been created using a pen or stylus on the surface of tablet display 201, or possibly by using a mouse or other free hand input device.

Prior to generating selection path 301, a user may have triggered a selection command by selecting a certain command, icon, button, menu item, etc. When generating selection path 301, a user may have begun (e.g., put her stylus down) at start point 302 and completed the stroke at end point 303. Likewise, for selection path 401, the may have triggered a selection command, and then begun at start point 402, ending the stroke at end point 403. Once complete, an ink-processing module may begin the process of determining whether or not the selection path represents a "wipe" selection.

FIGS. 3 and 4 together depict one embodiment providing a method for determining whether or not a particular selection path constitutes a "wipe" selection. Other methods for discerning a wipe selection from other types of selections are certainly possible. For this method, a determination may be accomplished by analyzing the endpoints and the direction of motion (e.g. tangent rays) of selection paths 301 and 401. For selection path 301, the path moves from start point 302 in the direction of start arrow 304, and from the end point 303, the path moves in the direction of end arrow 305. Clearly, it can be seen that these two arrows will not intersect, leading to the possible conclusion that a flatter "wipe" path was not intended, but instead, a more circular "lasso" path was intended. For selection path 401, start arrow 404 and end arrow 405 do intersect at hypothetical point 406. This intersection of arrows may lead to the conclusion that the user intended a flatter "wipe" path and wants to perform a wipe selection. As stated, other methods of determination may be used to discern a wipe selection.

Figure 5:
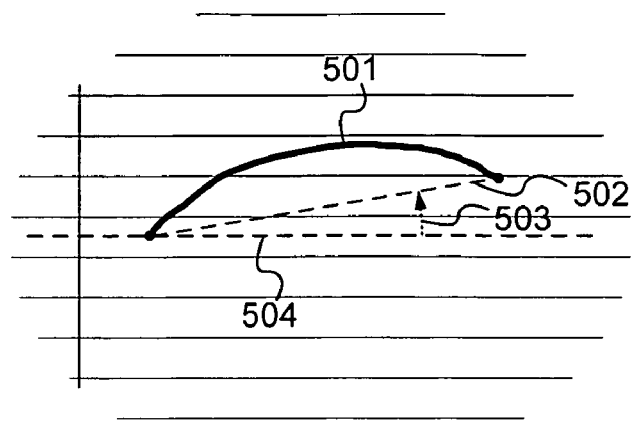
FIGS. 5 and 6 depict one embodiment for determining the orientation of a wipe selection.
Figure 6:
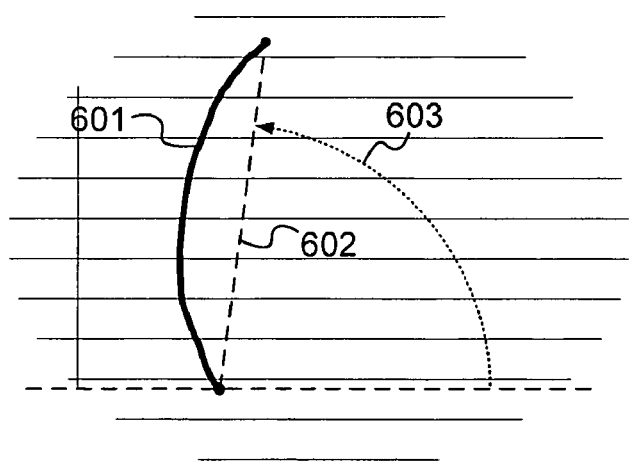

FIGS. 5 and 6 together depict one embodiment providing a method for determining whether or not a particular wipe selection constitutes a vertical or horizontal wipe. Generally, a wipe selection involves the automatic selection of everything to the right or left of the selection above or below the selection. A user may indicate a wipe selection by drawing a flat or slightly curved selection path, as shown in both figures. Selection path 501 generally shows a horizontal line, apparently indicating a vertical wipe. A program module may automatically create a segment 502 between the start and end points of an apparent wipe, and then measure the angle 503 of the segment from the horizontal 504 (or some other reference segment). If the angle is within, for example, plus or minus ten degrees of horizontal, then the program module may automatically determine that a vertical wipe is intended before proceeding. Selection path 601 has a similar segment 602 generated. Measuring angle 603 puts the wipe as more vertical, perhaps within, for example, plus or minus ten degrees of vertical (90 degrees). Determining that the angle of the wipe selection is within a certain range allows a program module to determine the orientation of the wipe before proceeding. Again, it should be noted that the methods, measurements and tolerances provided are merely examples, and other values and methods for determining the orientation of a wipe are possible.

In addition to determining an orientation of either horizontal or vertical, analyzing the curvature of a wipe may further indicate a direction of a wipe. For example, vertical wipe 501 is curved, with the convex portion generally pointing down. In this situation, a downward wipe is apparently intended. Curving the wipe in the opposite direction may alternatively be determined to mean an upward wipe, although all vertical wipes may be determined to be downward wipes regardless of curvature. Likewise, horizontal wipe 601 curves in such a way as to indicate a wipe to the right. As an alternative to examining curvature, a user may indicate a direction of wipe, by tapping on one side or the other of the wipe line. Other methods for determining or receiving an input about the direction to be wiped may be possible. Once the orientation and direction of a wipe is determined, objects in the wipe zone can be selected.

Figure 7:
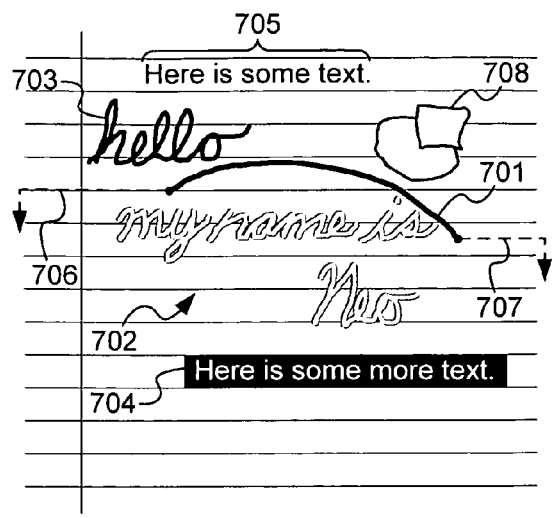
FIGS. 7-9 depict document objects being selected and moved by a vertical wipe according to one or more embodiments.

FIG. 7 depicts a series of document objects being selected by vertical wipe 701 according to one or more embodiments. On the display is shown a series of objects including, electronic ink 702 and 703, text 704 and 705, and drawing 708. A user, with a stylus, mouse, or other input device, has created a selection path across the middle of the display. Based on the slope of the line, a program module determines that the user most likely intended a vertical wipe. Further, due to the curvature of the wipe, a program module may determine that the wipe is directed downward. A wipe may then either select only those items directly below the selection path, or may broaden to extend across the document in both directions. Here, the scope of the wipe has been broadened, such that horizontal lines effectively extend from the endpoints out to the edge of the screen. Here, left extension 706 is higher than right extension 707. Alternatively, the left and right extensions might extend out at the same level, such as the start point, the end point, or an average in the middle. Another alternative would be to have the lines extend not horizontally but at the same angle as an imaginary line drawn through the endpoint. Each extension includes an arrow to show the direction of the wipe, although this may be obvious based on what objects are selected.

Regardless of how the selection path and extensions are generated, the objects on the appropriate side of the line (here, below the line) are selected. Here, ink objects 702 and text 704 are all selected. If the selection path were to have intersected any of the objects, it may be up to the user or the program module to determine whether intersected objects would be selected. Once selected, the user may use his or her input device to grab and wipe the selected items. These objects can only be moved along a single dimension, here along a vertical path.

Figure 8:
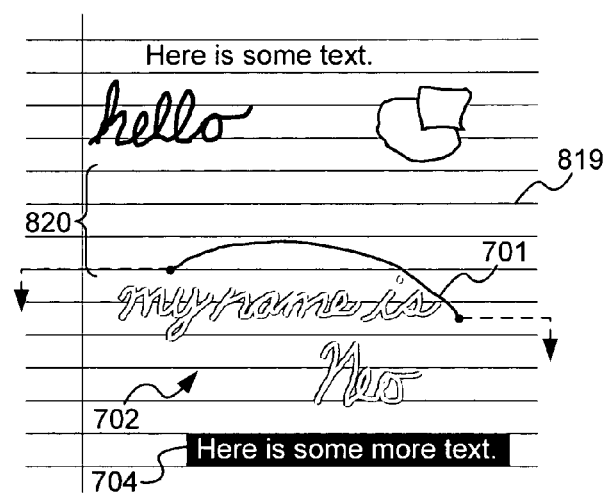

FIG. 8 depicts the same series of selected document objects after having been moved according to one or more embodiments. Here, ink objects 702 and text 704 have been wiped down the document. In moving down the document, the objects may have moved smoothly, or may have snapped at regular intervals. For example, the document here has rule lines 809 spaced at regular intervals. The objects may be restricted to wipe only in increments equivalent to rule lines 809. Once wiped, empty space 820 is created.

Figure 9:
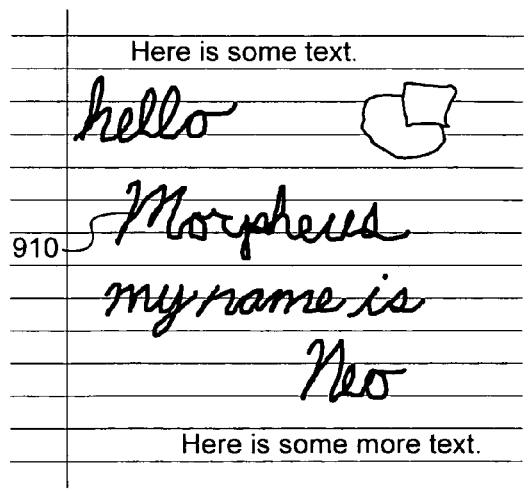

FIG. 9 depicts the document objects with new inserted ink object 910 according to one or more embodiments. The empty space created by the wipe may now be used to insert new objects. Here, ink object 910 has been inserted.

FIGS. 10-12 depict text having a horizontal wipe in order to insert new text according to one or more embodiments. In FIG. 10, the selection path created by the user crosses multiple lines of text 3, 4, and 5. However, only one line should be selected for a horizontal wipe due to the flowing nature of text in the paragraph (e.g., one line flows into the next line). A program module may make an educated guess based on the number of lines crossed by the selection path. For example, if two lines were crossed, the line with most of the path in it may be selected. If several lines were crossed, then the midpoint of the selection path may be used to select a line. Once the line is determined, then the text to the left or right (depending on how that's determined) will be selected.

If the selection path had crossed through a word, then many courses of action could be taken. The word could be split in half depending on the characters intersected, or the whole word could be selected. Another alternative would be to select none of the word that is intersected. Were this a vertical wipe, all of the lines below or above the selection path may be selected. Depending on the type of line drawn, other methods for determining whether particular text or objects are selected could be used. These methods may include allowing a user to set a parameter (e.g., a checkbox or setting labeled "Select Intersected Words & Objects?").

In FIG. 11, the user has wiped the text to the right. Again, because of the flowing nature of the paragraph, the words wrap around from line 4 to line 5. Inserted into the gap on line 4 may be spaces, tabs, or even some type of placeholder, possibly awaiting whatever is to be inserted. FIG. 12 depicts the same paragraph, now with the addition of electronic ink handwriting on line 4. Here, the new words have been written in the space created, ostensibly to be recognized and then replaced with equivalent text. At that point, any placeholder or additional spaces may be removed, depending on how the underlying ink-enabled application chooses to handle the insertion.

Figure 13:
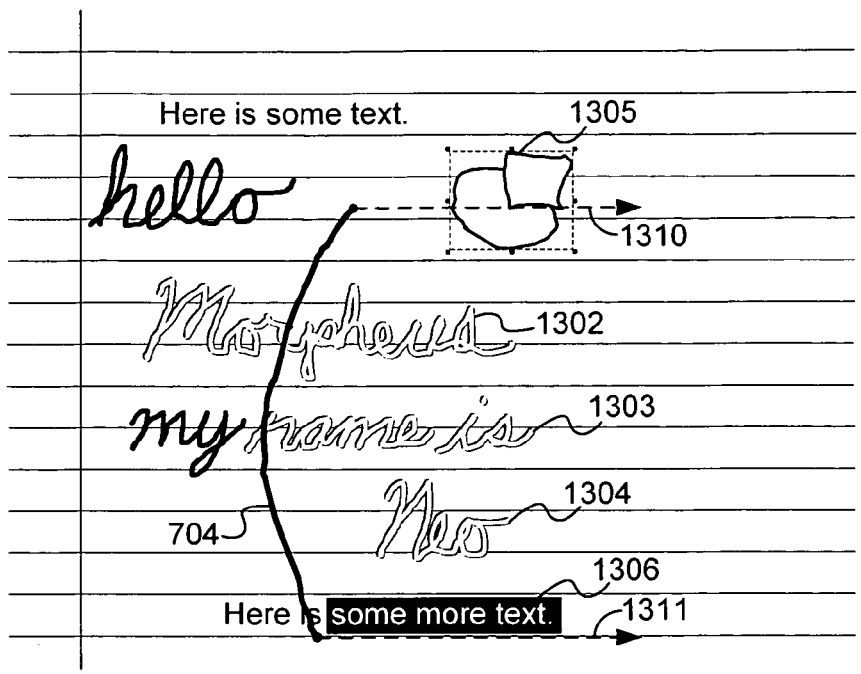
FIGS. 13-16 depict a collection of document objects, some of which are wiped to the right and to the left, according to one or more embodiments.

FIGS. 13-16 depict a collection of document objects, some of which are wiped to the right and to the left, according to one or more embodiments. FIG. 13 depicts an initial grouping of document objects having just been selected by horizontal wipe 1301. Ink objects 1302, 1303, and 1304 along with drawing 1305, and text 1306 have been determined to be in the "wipe zone," as delineated by arrows 1310 and 1311. Here, ink objects that are intersected by selection path 1301 are selected, whereas intersected text (i.e. the word "is") is not selected. This may be the choice of the user or the creator of the ink-enabled software. The intersected drawing 1305 is also selected, even though not entirely in the zone.

Figure 14:
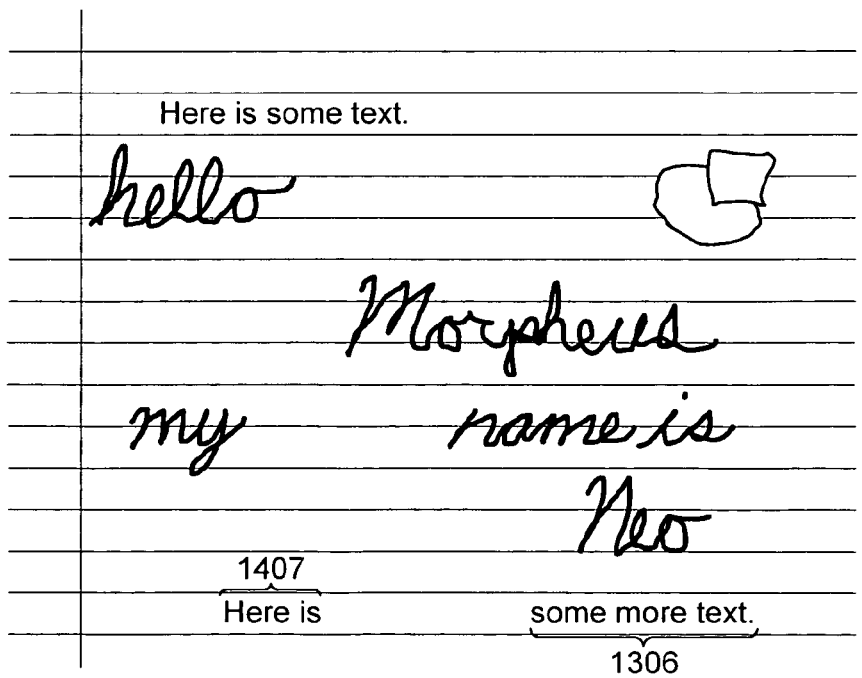

FIG. 14 depicts the selected group of objects after having been wiped to the right. In particular, it should be noted that the formerly selected text 1306 has been separated from the text 1407 with which it was originally associated. This may result in spaces or other placeholders inserted into the grouping of text, or it may result in two separate collections or text objects.

Figure 15:
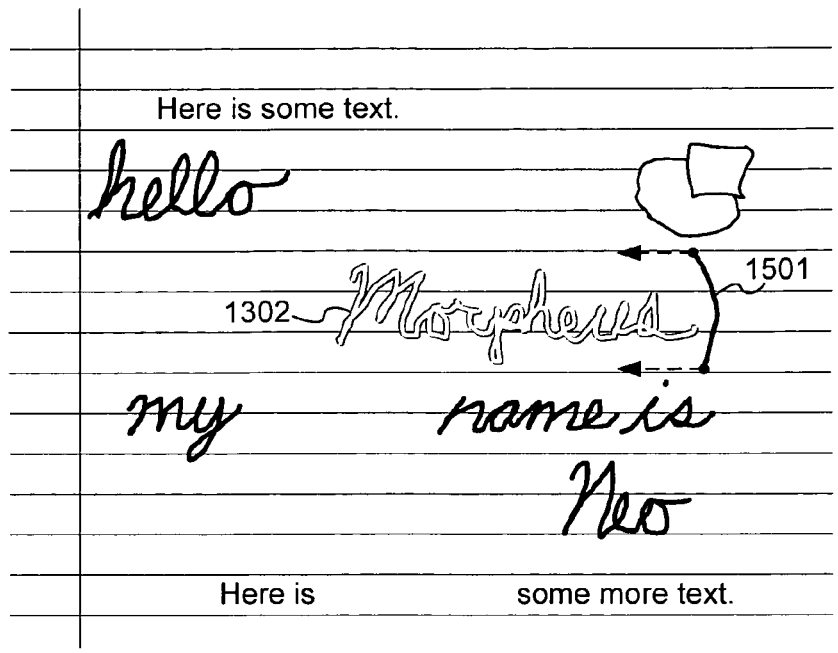
Figure 16:
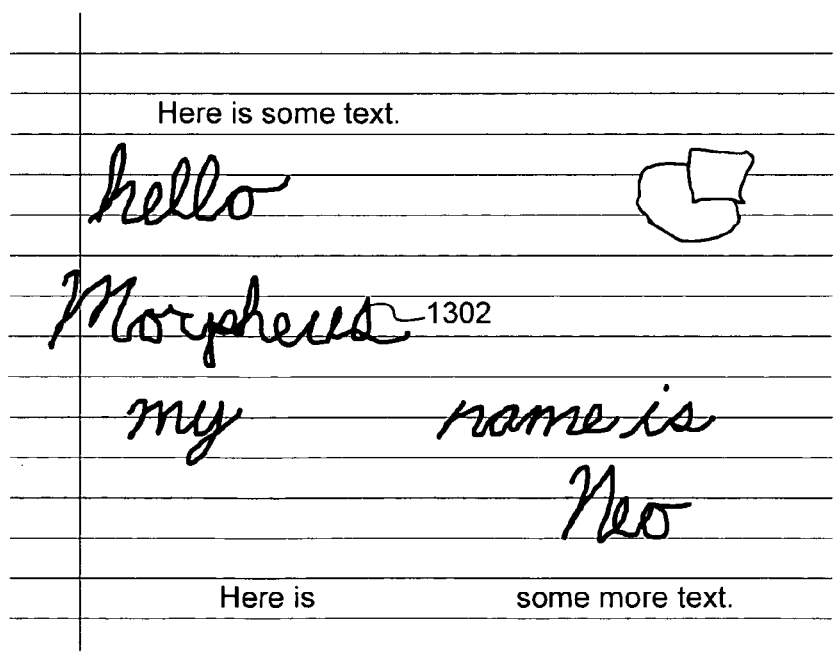

FIG. 15 now shows the selection of ink object 1302 being selected by a left horizontal wipe 1501. Here, no document objects are intersected, and merely the single object is set for a horizontal wipe to the left. FIG. 16 shows ink object 1302 after having been wiped back to the left. It should be noted that using the wipe, in the embodiments shown here, maintains the same vertical or horizontal value for the wiped objects, depending on the orientation of the wipe. This ensures a constant placement. However, other embodiments may allow free-form movement of the document objects selected by a free-form wipe tool.

Figure 17:
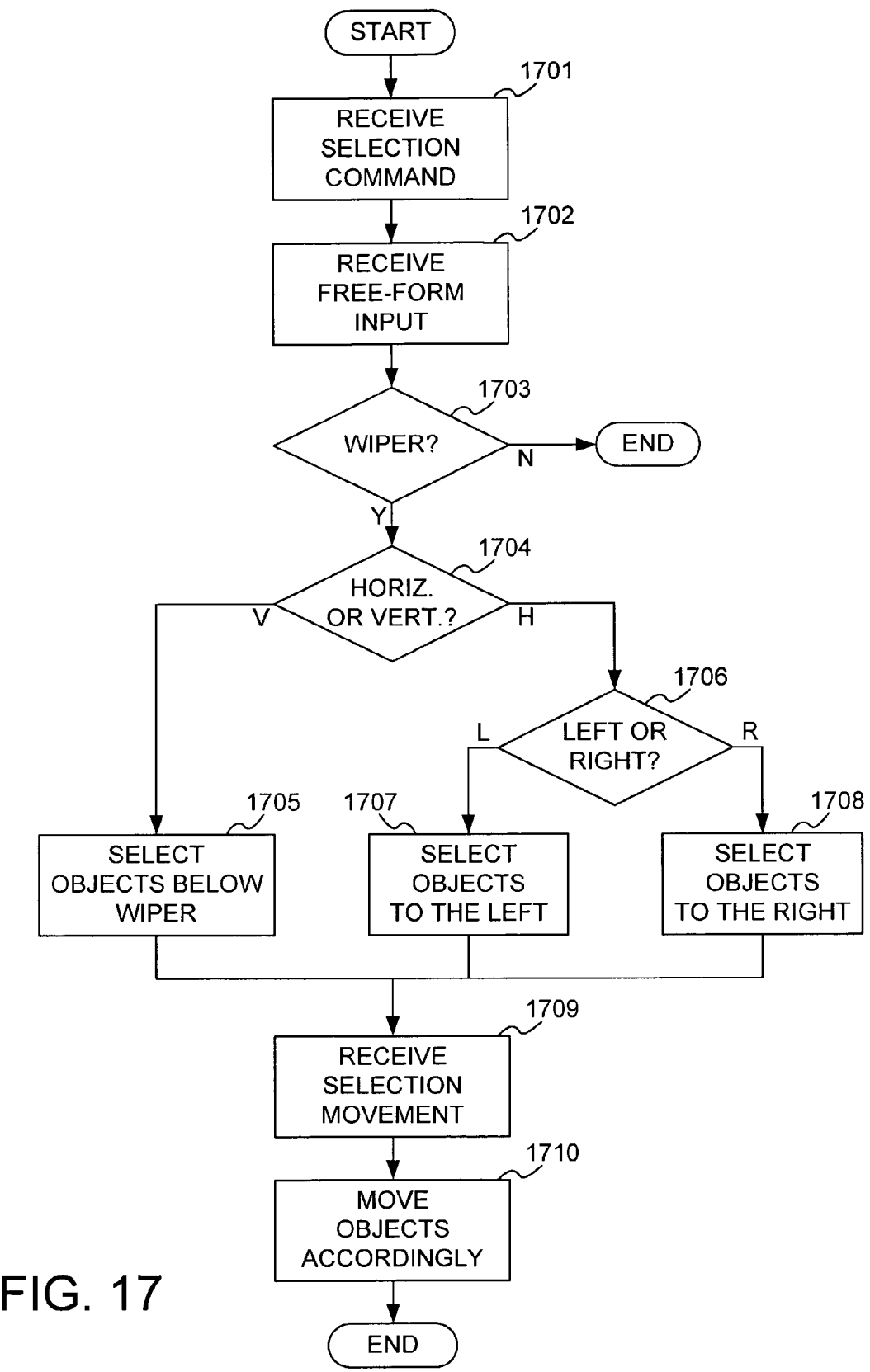
FIG. 17 is a flowchart depicting a method for using a free-form wiper tool according to one or more embodiments.

FIG. 17 is a flowchart depicting a method for using a free-form wiper tool according to one or more embodiments. The method shown here is intended merely to represent one process by which a free-form wiper tool may be implemented. Steps in this flowchart may be combined, skipped, and additional steps may be added. At step 1701, a selection command is received. This may be a general selection command, or one specifically designating a free-form wiper selection. This command may be received in the form of an interface or hardware button being pressed, a stylus gesture, voice command, or any other form of input. At step 1702, some variety of free-form input is received via a stylus, mouse, or other input device, and at decision 1703, the type of free-form selection is determined. If it is determined that a free-form wiper was intended (as opposed to a lasso selection or other type of selection), then the method continues on to decision 1704. If it is not a free-form wiper, then the method ends, or control is passed to whichever process handles the appropriate type of selection.

At decision 1704, it is determined whether the user intends a horizontal or vertical wipe. An angle of the selection path may be determined and the angle compared to ranges for each type of wiper, horizontal or vertical. A third option (not shown) would be to ignore the selection path if the wiper selection path is outside the ranges for a horizontal or vertical wipe. If the wiper is a vertical wipe, then objects below the wiper are selected at step 1705. Other embodiments may include determining an upward or downward wipe and selecting the objects appropriately. If the wiper is determined to be a horizontal wipe, then at decision 1706, it is determined whether the wipe is to the left or to the right. As stated above, this may be determined based on an additional user input, or on the curvature of the selection path. If a left wipe, then objects to the left of the wiper are selected at step 1707 and if a right wipe, then objects to the right are selected at step 1708. For all three selection steps 1705, 1707, and 1708, the selection path intersecting objects may complicate the process, but this can be handled programmatically, or through user preferences.

At step 1709, the user determines the direction and distance of movement for the wipe selection. This may be limited to a single degree of motion, horizontally or vertically, and may further be limited by a grid or step value. The user may indicate direction and distance by either grabbing the selection and moving it using a mouse, stylus, etc., or by using another form of input, such as arrow keys on a keyboard. At step 1710, the objects are moved accordingly, while maintaining a consistent flow to any text flows encountered. After that, the method terminates normally.

Figure 18A:
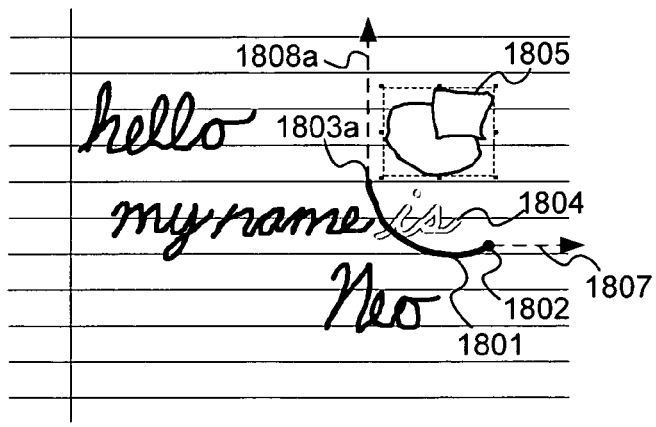
FIGS. 18A-18C depict a series of document objects being dynamically selected by a selection path according to one or more embodiments.

Additional embodiments may add flexibility to the direction in which a selection path may select and move objects with a free-form wiper tool. FIG. 18A depicts a series of document objects being dynamically selected by selection path 1801 according to one or more embodiments. Here, selection path 1801 begins with start point 1802, but has not yet ended. The start ray 1807 associated with start point 1802 may or may not be visible to a user of a free-wiper tool. Start ray 1807 may be located based on a portion of selection path 1801 closest to start point 1802. The ray may be tangent or close to tangent based on a certain length or percentage of the overall selection path. Start ray 1807 may be selected to fall along a horizontal or vertical axis associated with the start of selection path 1801.

As a user continues entering selection path 1801 (e.g., by continuing to draw the path with a stylus or a mouse), a terminating ray 1808a is dynamically calculated, and appropriate objects may be selected and unselected dynamically. For example, when the selection path reaches point 1803a, terminating ray 1808a may be located (as shown) based on the most immediate portion of the path just drawn. For example, the direction of the most recent path pixels or recent percentage of the overall path (e.g., 5%) may be used. Terminating ray 1808a may be selected from among a vertical or horizontal axis associated with current point 1803a and extending in the direction of recent motion.

At this point in the creation of selection path 1801, start ray 1807 is pointed to the right from start point 1802, and terminating ray 1808a points up from the current location of the cursor. In addition to dynamically positioning terminating ray 1808a, objects falling between the start ray 1807 and dynamic terminating ray 1808a may be automatically selected and deselected based on their falling between the rays. Here, ink word 1804, and drawing object 1805 fall within the quadrant delineated by the two rays and both are subsequently selected.

Figure 18B:
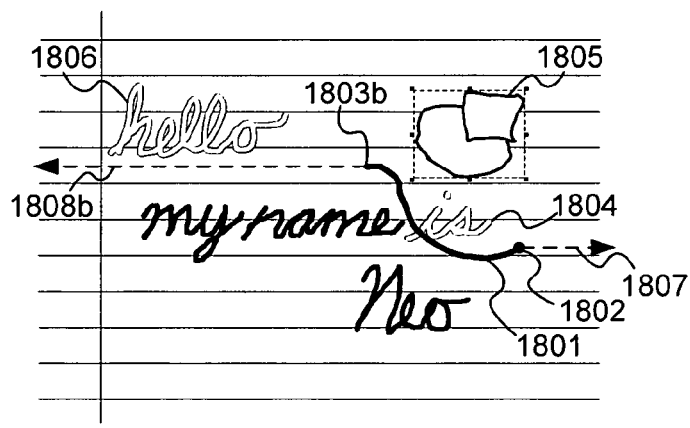

At a later point in time, selection path 1801 has moved in a different direction. FIG. 18B depicts the same series of document objects being dynamically selected by selection path 1801 according to one or more embodiments. Here, selection path 1801 has been extended to point 1803b. As a result in the change of direction of motion, dynamic terminating ray 1808b has been repositioned along a horizontal rather than vertical axis. This repositioning of terminating ray 1808b may be visible to a user, with the ray "snapping" into place dynamically. When terminating ray 1808b moves, the selection of objects is updated, and now ink word 1806 is added to the selection, for a possible vertical wipe (e.g., which can be moved up or down rather than left or right). These three objects represent the visible objects located on a chosen side of the selection path. As discussed above, the particular side of the selection path may be based on an analysis of the path (e.g., curvature) or analysis of the changing selection (e.g., moving from the "up and right" quadrant to the "up" half of the document as opposed to the "down" half below the selection path).

Figure 18C:
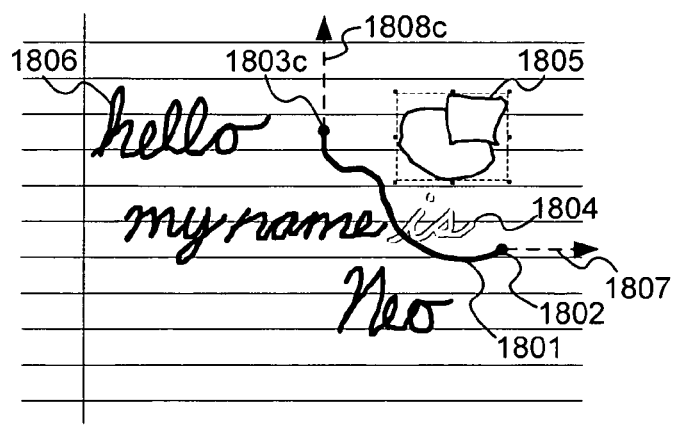

FIG. 18C depicts a third and final point for selection path 1801 over time according to one or more embodiments. Here, the direction of the selection path has changed once again before terminating at end point 1803c. Terminating ray 1808c is located pointing up along a vertical axis, and once again the initially selected group of objects is again selected, with ink word 1806 being deselected. The final selection is the "up and right" quadrant, and selected items may be constrained in how they may be moved. For a quadrant selection, rather than limiting the objects to one degree of motion, they may be moved in two directions, up or to the right. Additional embodiments may allow additional degrees of motion, for example, along a diagonal line, up and to the right.

Figure 19:
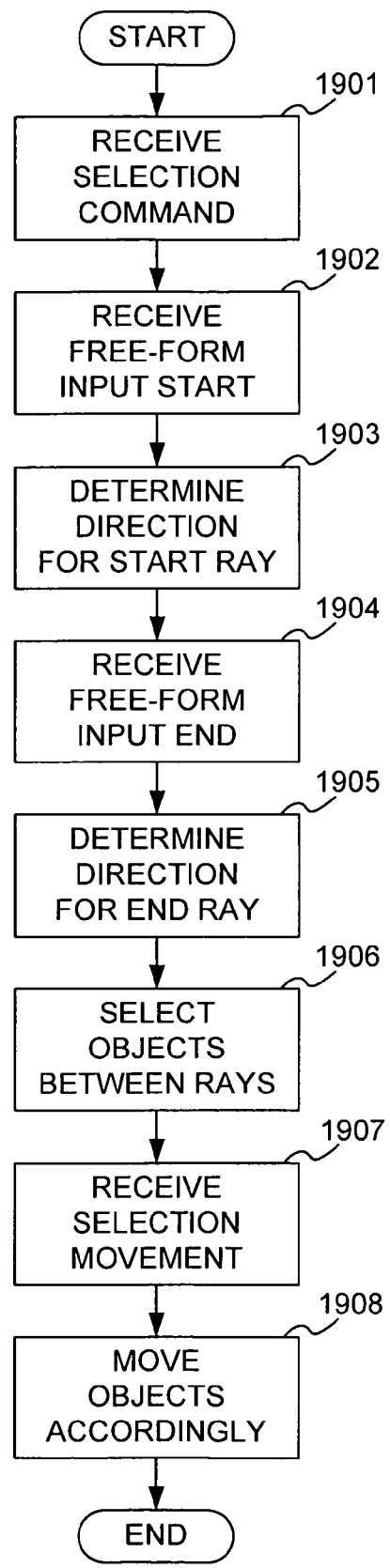
FIG. 19 is a flowchart depicting a method for selecting objects in a document using two rays according to one or more embodiments.

FIG. 19 is a flowchart depicting a method for selecting objects in a document using two rays to select a selection region of the document. At step 1901, and initial command is received indicating that a selection is about to be inputted. This command may come in the form of a button clicked on the screen, a keyboard shortcut, or even a gesture made by a stylus associated with display device. At step 1902, the start of a free-form selection is received. Once enough information is collected, at step 1903 a direction and location for a start ray associated with the start of the selection path is determined. At step 1904, the end of a selection path is received, and a terminating or "end" ray is determined at step 1905 as discussed above. The terminating ray may point in any direction, including the same direction as the start ray. At step 1906 a selection of objects is determined. This selection may be dynamically made during the movement of a cursor to create a selection path. Alternatively, the selection may be made once the selection path is terminated.

At step 1907, a movement associated with the selection is received, and the selected objects may be moved at step 1908 in either a constrained or unconstrained fashion. As with the previous flowchart, the steps shown are intended as examples. Steps may be added, removed, combined, or otherwise modified and yet the process remain effectively the same.

Further embodiments may also provide alternatives to an end user for selecting objects on a document. In the case of a half, rather than quadrant selection, it may not always be clear which half of the document is intended to be selected. Although the curvature of the line may be analyzed, a close call may go the wrong way. A user may be able to shift the selection by inputting a particular command by clicking an icon, or by simply tapping or moving the cursor to the other half of the documents. For example, if a user draws a relatively straight line down the middle of a document, and the objects to the right of the line are automatically selected for a horizontal wipe, the user may shift the selection to objects on the left simply by moving the cursor and hovering over the other half. Default behavior may be programmed or otherwise be modified to weight the selection of objects based on a set of defaults. For example, when creating a horizontal wipe, objects below a line may always be selected initially. Likewise, objects to the right of a vertical wipe may be selected by default.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings. For example, those skilled in the art will see that the described free-form wiper tool need not be used an electronic ink-enabled application, but may be used in any conventional application using a mouse or other free-form input device.

We claim:

1. A computer-implemented method for enabling a free-form wiper in an electronic document, the method comprising:

receiving a free-form selection path;

determining whether the free-form selection path is at least one member of a group comprising: a free-form wiper and a free-form lasso, wherein determining whether the free-form selection path is a free-form wiper includes analyzing rays tangent to endpoints of the free-form selection path to determine if the rays intersect;

determining a direction associated with the free-form selection path from among eight directions, up, down, left, right, up and left, up and right, down and left, and down and right; and selecting document objects on the electronic document, objects that are situated in the direction relative to the free-form selection path.

2. The computer-implemented method of claim 1, wherein the free-form selection path is received using a touch-sensitive display.

3. The computer-implemented method of claim 1, wherein the document objects comprise electronic ink.

4. The computer-implemented method of claim 1, wherein analyzing the free-form selection path comprises analyzing the curvature of the free-form selection path with respect to the end points of the free-form selection path.

5. A system for selecting and wiping document objects on an electronic document, the system comprising:

an input device for receiving a free-form selection input;
a display for displaying the electronic document;
a memory storing executable instructions; and
a processor configured to execute the executable instructions, including steps of:

receiving the free-form selection input from the input device;

determining whether the free-form selection input is at least one member of a group comprising: a free-form wiper and a free form lasso, wherein determining whether the free-form selection input is a free-form wiper includes analyzing rays tangent to endpoints of the free-form selection input to determine if the rays intersect;

determining an orientation associated with the free-form selection input;

determining a direction associated the free-form selection input; and selecting document objects that are situated in the direction relative to the free-form selection input.

6. The system of claim 5, wherein the processor is further configured to execute the steps of:

receiving a movement input; and
moving the selected document objects in accordance with the movement input.

7. The system of claim 6, wherein the input device and the display are integrated, such that input directed to the display is sensed by the input device.

8. The system of claim 7, wherein receiving the free-form selection input comprises receiving one or more strokes by a stylus upon the integrated input device display.

9. The system of claim 8, wherein receiving a movement input comprises receiving one or more strokes by a stylus upon the integrated input device display.

10. The system of claim 6, wherein moving the selected document objects in accordance with the movement input comprises moving the objects along a single degree of motion.

11. The system of claim 5, wherein determining the direction associated with the free-form selection input comprises determining the direction from among at least four directions, up, down, left, and right.

12. The system of claim 5, wherein the processor is further configured to execute the steps of:

receiving a selection command.

13. A computer-implemented method for enabling a free-form wiper in an electronic document, the method comprising:

receiving a free-form selection path;
determining a direction associated with the free-form selection path, wherein determining the direction includes analyzing the free-form selection path, wherein analyzing the free-form selection path to determine the direction includes determining a segment connecting the two ends of the free-form selection path, measuring an angle of variance between the segment and a reference segment, and comparing the angle of variance to a plurality of ranges, wherein each range is associated with a possible direction of the free-form selection path; and selecting document objects on the electronic document, objects that are situated in the direction relative to the free-form selection path.

14. A computer-implemented method for enabling a free-form wiper in an electronic document, the method comprising:

receiving a free-form selection path;
determining a direction associated with the free-form selection path, wherein determining the direction includes analyzing the free-form selection path, wherein analyzing the free-form selection path to determine the direction includes:

determining a first ray associated with a start point of the free-form selection path from among at least one member of a group comprising: up direction, down direction, right direction and left direction, determining a second ray associated with an end point of the free-form selection path from among at least one member of a group comprising: up direction, down direction, right direction and left direction, and determining the direction as falling between the first and second rays; and selecting document objects on the electronic document, objects that are situated in the direction relative to the free-form selection path.

15. A computer-readable storage medium having computer-executable instructions for enabling a free-form wiper in an electronic document, the instructions comprising:

receiving a free-form selection path;
determining whether the free-form selection path is at least one member of a group comprising: a free-form wiper and a free form lasso, wherein determining whether the free-form selection path is a free-form wiper includes analyzing rays tangent to endpoints of the free-form selection path to determine if the rays intersect;

determining a direction associated with the free-form selection path; and selecting document objects on the electronic document, objects that are situated in the direction relative to the free-form selection path.

16. The computer-readable storage medium of claim 15, wherein the free form selection path is received using a touch-sensitive display.

17. The computer-readable storage medium of claim 15, wherein the document objects comprise electronic ink.

18. The computer-readable storage medium of claim 15, wherein determining the direction includes analyzing the free-form selection path, wherein analyzing the free-form selection path to determine the direction includes determining a segment connecting the two ends of the free-form selection path, measuring an angle of variance between the segment and a reference segment, and comparing the angle of variance to a plurality of ranges, wherein each range is associated with a possible direction of the free-form selection path.

19. The computer-readable storage medium of claim 15, wherein determining the direction includes analyzing the free-form selection path, wherein analyzing the free-form selection path to determine the direction includes:

determining a first ray associated with a start point of the free-form selection path from among at least one member of a group comprising: up direction, down direction, right direction and left direction, determining a second ray associated with an end point of the free-form selection path from among at least one member of a group comprising: up direction, down direction, right direction and left direction, and determining the direction as falling between the first and second rays.

20. The computer-readable storage medium of claim 15, wherein analyzing the free-form selection path comprises analyzing the curvature of the free-form selection path with respect to the end points of the free-form selection path.

\* \* \* \* \*